UNITED STATES PATENT OFFICE.

HENRI RAYMOND VIDAL, OF PARIS, FRANCE.

PROCESS OF MAKING PARAMIDOPHENOL.

SPECIFICATION forming part of Letters Patent No. 595,897, dated December 21, 1897.

Application filed July 24, 1897. Serial No. 645,857. (No specimens.) Patented in France February 27, 1897, No. 264,511, and in England March 3, 1897, No. 5,697.

*To all whom it may concern:*

Be it known that I, HENRI RAYMOND VIDAL, of Paris, France, have invented certain new and useful Improvements in the Production of Paramidophenol, (for which I have obtained patents in France, No. 264,511, dated February 27, 1897, and in England, No. 5,697, dated March 3, 1897,) which is fully described in the following specification.

The reduction of oxyazobenzol or of paranitrophenol by sulfid of sodium alone causes the production of equal parts of ill-defined products and of paramidophenol. I have found that if a certain quantity of a caustic alkali, such as caustic soda, is added the foreign products are not produced, and paramidophenol is exclusively obtained. With this object I heat in an iron caldron, which is provided with an agitator, sulfid of sodium, three kilos; oxyazobenzol, two kilos, one hundred grams; caustic soda, one kilo. I raise the mass to a temperature of 180° centigrade and add water until the yellow coloration of the oxyazobenzol has disappeared. I then allow the mass to dry and remove it from the apparatus. The mass, dissolved in water, is precipitated by an acid, and the paramidophenol is collected upon a filter.

The invention embraces the reduction, under the same conditions, of orthonitrophenol, the dinitrophenols 1 2 4 and 1 2 6, and the like in order to obtain the corresponding amido compounds, and it is to be understood that although but one of the class of bodies to which the process is applicable is specified in the claim the other analogous bodies are intended to be included as equivalents for the production of the corresponding amido bodies.

Having now particularly described and ascertained the nature of my said invention and in what manner the same is to be performed, I declare that what I claim is—

The process of obtaining paramidophenol unmixed with other bodies, by reducing oxyazobenzol by the action of sulfid of sodium in presence of a caustic alkali, substantially as described.

In testimony whereof I have signed this specification in the presence of two subscribing witnesses.

HENRI RAYMOND VIDAL.

Witnesses:
EDWARD P. MACLEAN,
ANTOINE PREUSSANNER, Jr.